(12) United States Patent
Kumar

(10) Patent No.: US 6,539,016 B2
(45) Date of Patent: Mar. 25, 2003

(54) SYSTEM AND METHOD FOR IMPROVING COMPRESSION ON A TELEPHONE LOOP

(75) Inventor: Yatish Kumar, Ottawa (CA)

(73) Assignee: Catena Networks, Inc., Redwood Shores, CA (US)

( * ) Notice: Subject to any disclaimer, the term of this patent is extended or adjusted under 35 U.S.C. 154(b) by 0 days.

(21) Appl. No.: 09/872,259

(22) Filed: Jun. 12, 2001

(65) Prior Publication Data

US 2002/0015410 A1 Feb. 7, 2002

(30) Foreign Application Priority Data

Jun. 12, 2000 (CA) ............................................. 2311103

(51) Int. Cl.[7] .................................................. H04J 3/24
(52) U.S. Cl. .................... 370/395.1; 370/401; 370/465; 370/536; 370/538
(58) Field of Search ............................. 370/259, 395.1, 370/395.2, 395.21, 395.52, 396, 397, 398, 399, 401, 402, 403, 404, 465, 468, 203, 395.61, 536, 538

(56) References Cited

U.S. PATENT DOCUMENTS 4,613,901 A  *  9/1986  Gilhousen et al.
5,621,728 A        4/1997  Lightfoot et al.
5,650,994 A        7/1997  Daley
5,677,905 A  * 10/1997  Bigham et al.
5,742,765 A        4/1998  Wong et al.
2002/0015410 A1 * 2/2002  Kumar

OTHER PUBLICATIONS

ADSL Forum, Technical Report TR–017 "ATM Over ADSL Recommendation" Mar. 1999.

* cited by examiner

*Primary Examiner*—Dang Ton
*Assistant Examiner*—Shick Hom
(74) *Attorney, Agent, or Firm*—Townsend and Townsend and Crew LLP

(57) ABSTRACT

An asymmetric digital subscriber line (ADSL) termination unit, which at the transmission end includes a descrambler and a compressor between its scrambler and interleaver. The present invention provides for the use of compression on the data in a channel to remove some of the inherent redundancy, in order to yield much better throughput, particularly in conjunction with certain powerful forward error correction (FEC) schemes. In this manner the compression may be performed on unscrambled data that has a higher redundancy than scrambled data, thereby improving compression. At the reception end, the ADSL termination unit includes a decompressor and a scrambler between its deinterleaver and descrambler.

25 Claims, 4 Drawing Sheets

SYSTEM AND METHOD FOR IMPROVING COMPRESSION ON A TELEPHONE LOOP

BACKGROUND OF THE INVENTION

The present invention relates to the field of data compression, and more particularly to data compression on a digital subscriber line (DSL) loop.

With the increasing popularity of the Internet, there has been a corresponding increase in the demand for high rate digital transmission over the local subscriber loops of telephone companies. A loop is a twisted-pair copper telephone line coupling a user or subscriber telephone to a central office (CO).

Traditionally, data communication equipment uses the voice band of the subscriber loop. Such equipment includes voice band modems, which operate at up to 56 kbps using compression techniques. On the other hand, Integrated Services Digital Network (ISDN) systems have boosted data rates over existing copper phone lines to 120 kbps. However, traditional voice band equipment is limited by the maximum data rate of the existing switching networks and Pulse Code Modulation (PCM) data highways.

Utilizing the frequency bandwidth of the loop outside the voiceband has enabled other high-speed systems to evolve. However, because loops can differ in distance, diameter, age and transmission characteristics depending on the network, they pose some limitations and challenges for designers of these high-speed systems.

Current high-speed digital transmission systems of the above type include asymmetric, symmetric, high-rate, and very high-rate digital subscriber loops, conventionally known as ADSL, SDSL, HDSL and VDSL, respectively. Normally these and other similar protocols are known as xDSL protocols.

Of these flavors of xDSL, ADSL is intended to co-exist with traditional voice services by using different frequency spectra on the loop. An overview of ADSL is provided in the ADSL Forum's Technical Report TR-017, "ATM Over ADSL Recommendation" (March 1999), which is incorporated herein by reference for all purposes. More detail on ADSL can be found in the document ANSI T1.413, "Asymmetric Digital Subscriber Line (ADSL) Metallic Interface" (1998), which is incorporated herein by reference for all purposes.

In the future, it is possible that multiple different transmission schemes may be employed in different frequency bands on the same loop, and that these transmission schemes may include traditional analog voice services as well as current and new forms of xDSL. In today's ADSL systems, the plain old telephone services (POTS) use the frequency spectrum between 0 and 4 kHz and the ADSL uses the frequency spectrum between 30 kHz and 1.1 MHz for data over the telephone line. ADSL partitions its frequency spectrum with upstream (subscriber to CO) transmission in a lower frequency band, typically 30 kHz to 138 kHz, and with downstream transmission in a higher frequency band, typically 138 kHz to 550 kHz or 1.1 MHz. ADSL uses a discrete multi-tone (DMT) multi-carrier technique that divides the available bandwidth into approximately 4 kHz sub-channels.

In order to maximize the throughput on a given channel, it is important to minimize the redundancy in the transmitted data, followed by the careful addition of some redundancy (in order to enable the use of forward error correction (FEC)). Thus far, there has been a lot of activity to improve the performance of DSL (particularly on long loops) with the use of better FEC. Reed-Solomon encoding and Trellis Coded Modulation are already part of the G.DMT specification for ADSL, and further additions of concatenated convolutional and turbo codes are open issues for the G.DMT specification.

It is appropriate to consider first whether data compression should be performed at the physical layer in an ADSL modem. Performing data compression at the physical layer for a DSL link is practical. If performed at higher layer protocols and applications, it is difficult to ensure that the union of all application programs, operating systems, network protocols, and content providers would present data to the ADSL link in a compressed format. Some users of some applications would use data compression, while many users of the Internet would continue to transfer files, download web pages, and exchange email without the benefit of compression.

The inclusion of data compression in the DSL link does no harm, but it potentially provides a great benefit. It is possible to design a data compression scheme that will not provide a degradation of throughput.

Finally, DSL provides data rates and services that are quite different from dialup modems and Ethernet-based local area networks (LANs). DSL specific issues need to be addressed by DSL standards and cannot be left to general networking solutions. One example of a DSL specific issue is the use of ATM cells over the link. It is possible to exploit the redundancy in the ATM cell headers to help compress the traffic on the loop by up to 10%. Another example is the multiplicity of services that can be run on the bandwidth of a DSL link. It is possible to download a file while browsing the web and listening to an audio broadcast. Compression algorithms in such an environment need to be agile to the interleaved traffic.

BRIEF SUMMARY OF THE INVENTION

The present invention provides for the use of compression on the data in a channel to remove some of the inherent redundancy, in order to yield much better throughput, particularly in conjunction with certain powerful FEC schemes. At the transmission end, an ADSL termination unit includes a descrambler and a compressor between its scrambler and interleaver. In this manner the compression may be performed on unscrambled data that has a higher redundancy than scrambled data, thereby improving compression. At the reception end, the ADSL termination unit includes a decompressor and a scrambler between its deinterleaver and descrambler.

The removal of redundancy on the transmitted data is independent of the data rate on the loop. However, for long loops with reduced data rates, the improvement can provide significant benefits to the end user of the DSL service.

According to one embodiment of the present invention, a compression system for ADSL includes a central office ADSL termination unit (ATU-C) and a remote ADSL termination unit (ATU-R). The ATU-C includes a descrambler and a compressor between its scrambler and interleaver. The ATU-R includes a decompressor and a scrambler between its deinterleaver and descrambler. In this manner, compression may be performed on unscrambled data that has a higher redundancy than scrambled data, thereby improving compression.

According to another embodiment of the present invention, a transmitting ATU includes an asynchronous transfer mode (ATM) transmission convergence circuit, a scrambler circuit, a descrambler circuit, a compression circuit, and an interleaver circuit. The descrambler circuit and compression circuit operate as described above regarding the compression system.

According to yet another embodiment of the present invention, a receiving ATU includes a deinterleaver circuit, a decompression circuit, a scrambler circuit, a descrambler circuit, and an ATM transmission convergence circuit. The scrambler circuit and decompression circuit operate to decompress the compressed data received from the above-described transmitting ATU.

One aspect of the invention provides for the limiting of the maximum compression bandwidth to assist ATM provisioning.

Another aspect of the invention provides for limiting the average compression bandwidth to assist ATM provisioning.

A still further aspect of the invention provides for ATM flow control over the ADSL loop to assist ATM provisioning in the presence of bandwidth variation. (Compression is one way to get bandwidth variation, among others.)

A still further aspect of the invention provides for the use of multiple or hybrid compression algorithms to match the interleaved data traffic seen on ADSL loops.

These aspects of the invention are further detailed with reference to the following figures and detailed description.

DETAILED DESCRIPTION OF THE INVENTION

Figure 1:
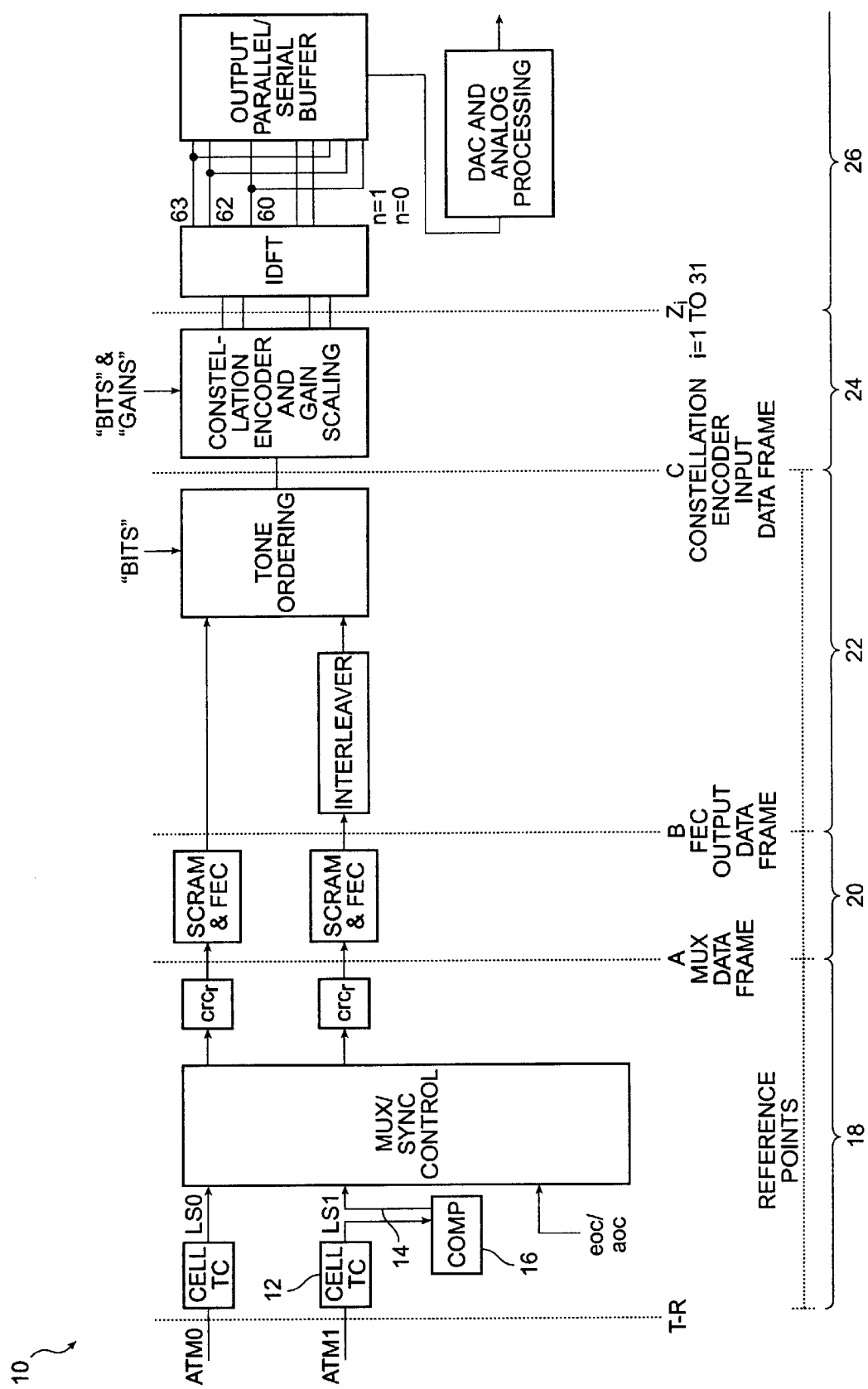
FIG. 1 shows the location of the compression function (COMP) in the ATU reference transmitter model.

The compression function according to the present invention is performed by a compression block 16 between an ATM cell transmission convergence (TC) block 12 and an LS1 input 14 to the interleaved data stream as shown in the ADSL termination unit (ATU) 10 of FIG. 1. Under ADSL standards, the LS0 input corresponds to a "fast" path that generally has a higher bit error rate and lower latency than that of the LS1 input, which corresponds to an "interleaved" path. The remaining functions of the ATU 10 are standard and are described briefly as follows with reference to functional sections 18–26. In section 18, aside from the novel compression performed by the compression block 16, the ATU 10 performs transmission convergence, multiplexing, synchronization control, and cyclic redundancy checking. In section 20, the ATU 10 performs forward error correction. In section 22, the ATU 10 performs interleaving (if appropriate) and tone ordering. In section 24, the ATU 10 performs constellation encoding and gain scaling. In section 26, the ATU 10 performs inverse discrete Fourier transforming, parallel/serial buffering, digital-to-analog conversion, and analog processing. As FIG. 1 corresponds to transmission, similar blocks at the receiving end perform analogous inverse functions.

Performing compression before interleaving provides the benefit that the compression algorithm can tackle the redundancy inherent to the ATM headers. In the downstream direction, the ATM cells have almost reached their destination, so some of their header information is no longer necessary. Header redundancy can account for 10% of the usable bandwidth. Furthermore, this placement allows the compression algorithm to work in the presence of scrambling within the ATM cell payload. This concept is described in the next section.

ATM Cell Scrambling

Most compression algorithms perform poorly if the source data has been scrambled. Scrambling makes it impossible for the algorithm to identify redundancy in the source data. During header error check (HEC) delineation the payload might be interpreted as a valid ATM header. To eliminate this misinterpretation, the ATM layer is conventionally required to scramble its payload. This can be handled in the presence of compression as shown in FIG. 2.

Figure 2:
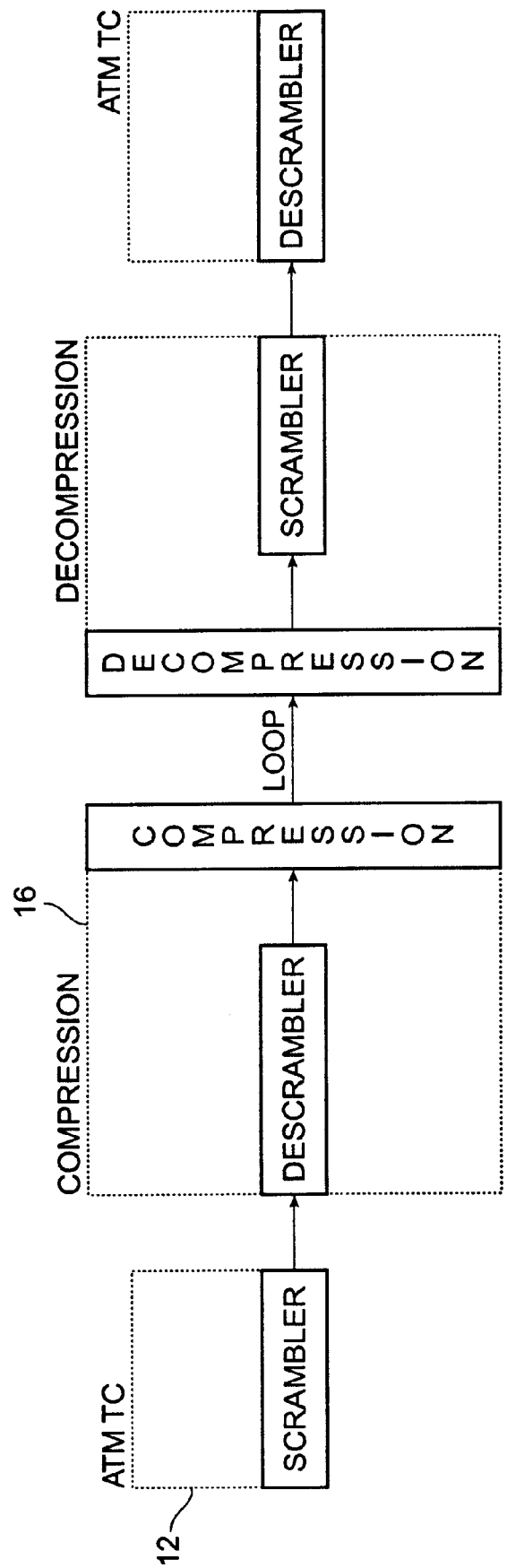
FIG. 2 is a schematic diagram showing a method for making compression compatible with ATM payload scrambling.

It can be seen from FIG. 2 that at the ATM transmission convergence (TC) level, the requirement for payload scrambling is met with a descrambler/scrambler pair as part of the compression function. The operation for the additional descrambler/scrambler pair is the same as that of the ITU-T Recommendation I.432 using the self-synchronizing polynomial $X^{43}+1$.

The decompressed data rate is source data dependent, which has the following implications:

ATM Permanent Virtual Circuit (PVC) Provisioning

The unpredictable requirement for network bandwidth at the central office ADSL termination unit (ATU-C) required to service a DSL loop using compression is an issue that requires some careful consideration. An analogous problem exists in systems developed using present DSL technology. If a shelf is built to support 100 full rate modems, the theoretical maximum bandwidth required will be 6 Mpbs× 100=600 Mbps of data. However, depending on the statistics of the number of active subscribers, and the length of the loops connected to the 100 modems, the actual bandwidth used can be significantly less. System designers have a choice to either accommodate the peak traffic, or allow some blocking for the average traffic they feel is reasonable. This determination of the bandwidth to be provided is termed "provisioning."

Similarly, with statistically variable bandwidth in the presence of compression, it is possible either to provision for the maximum compressed data rate, or to provision for a reasonable average. However, there are two differences in the analogy. First, in the shelf example the statistics are an ensemble average over many users, and in the compression case the statistics are a time average for a single user. Second, in the shelf example it is possible to calculate the absolute maximum traffic that can be generated, but in the case of compression it is more difficult to establish this value. The following two sections address these issues.

Limiting the Maximum Traffic Generated Through Compression

With a simple implementation of data compression, it is possible to generate a very high peak data rate at the output of the decompression circuit. For example, using run length encoding, if a user is sending all 0's, it is possible to transmit a single 0 along with a count. If the count is large, a very large amount of data is instantaneously created at the output. Furthermore, the latency to produce the first output is determined by the length of the burst. Such pathological cases can be avoided by placing latency and coding gain requirements on the compression algorithm.

Once this is accomplished, it is possible to determine the peak throughput, given an uncompressed line rate. This absolute maximum can be used to determine the network bandwidth that needs to be provisioned at the ATU-C.

Provisioning Less Than the Absolute Maximum Possible Bandwidth:

There are two possible solutions to provision less than the absolute maximum possible bandwidth. The first solution is to limit the provisioning of compression to longer loops with inherently less bandwidth. Assuming that the maximum compression gain is limited to a factor of 2×, in a system designed to service 6 Mbit modems, if a subscriber loop has an uncompressed bandwidth greater than 3 Mbits, then compression is disabled for that loop. A user on a long loop using compression is then indistinguishable from a user on a short loop with no compression.

The second solution is to implement flow control over the DSL loop. If a subscriber's peak bandwidth exceeds the buffer space allocated in the central office, the flow of ATM cells is reduced at the remote ADSL termination unit (ATU-R) until the average bandwidth matches the provisioned PVC at the central office. A variation of this algorithm would be the use of feedback in the compression algorithm, which would ensure that the average data rate does not exceed a prescribed amount. This amounts to a cap on the average performance (rather than the peak performance) of the algorithm.

In summary, compression maximizes the channel capacity on all loops, as well as complementing the benefits that would come from more powerful error correction techniques. The gains can be particularly important to subscribers with access to limited bandwidth on long loops.

Specific Implementations

FIGS. 3–6 show specific implementations of these concepts. Although the description uses the term "circuit," this term is intended to be broadly read to include both dedicated, specific integrated circuit hardware as well as general, programmable hardware under software or firmware control, as well as combinations thereof.

Figure 3:
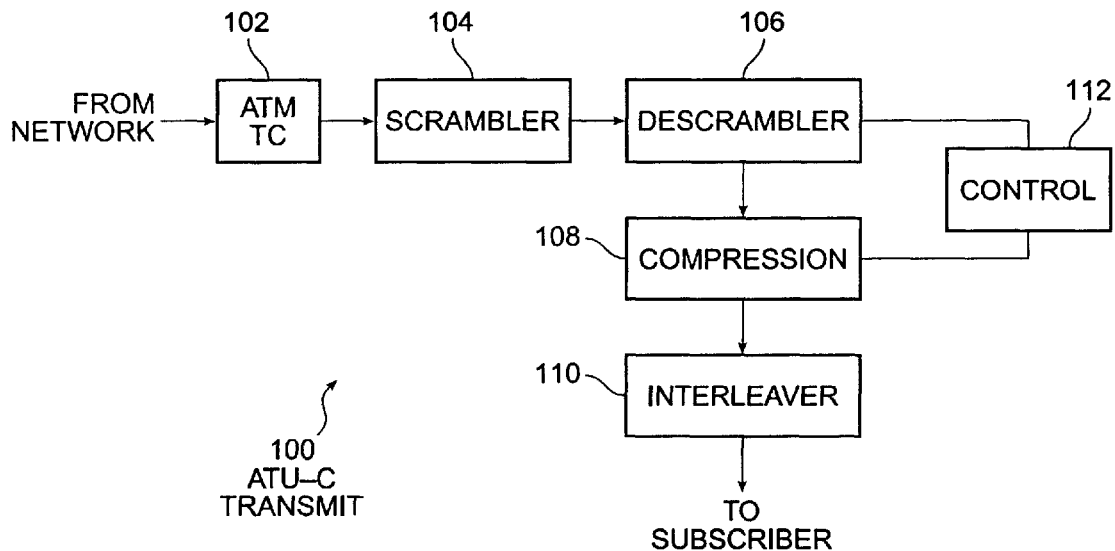
FIG. 3 is a block diagram of a portion of the transmission side of a central office ATU.

FIG. 3 shows an ATU-C (transmission portion) 100 according to an embodiment of the present invention. The ATU-C 100 includes an ATM TC circuit 102, a scrambler circuit 104, a descrambler circuit 106, a compression circuit 108, an interleaver circuit 110, and a control circuit 112. The ATM TC circuit 102 performs transmission convergence on the ATM data from the network to be transmitted to the subscriber on the subscriber loop. The scrambler circuit 104 performs scrambling on the output of the ATM TC circuit 102. The interleaver circuit 110 interleaves the data prior to transmission to the subscriber. The ATM TC circuit 102, scrambler circuit 104 and interleaver circuit 110 may be standard components and are not further detailed, nor are the other standard components of ATU-C 100 that are not shown. Furthermore, the ATU-C 100 may perform other functions that are not necessary to the understanding of the present invention and are not described in detail. Such functions may include idle cell insertion, header error control generation, bit timing ordering, cell delineation, header error control verification, cell rate decoupling, signaling facilitation, connection admission control, resource management, and layer/plane management functions.

Between the scrambler circuit 104 and the interleaver circuit 110, compression is performed. As discussed previously regarding FIG. 2, descrambling is needed to allow redundancy to be exploited. The descrambler circuit 106 performs this function. After the data has been descrambled, the compression circuit 108 compresses it. The compression algorithm used may be any standard compression algorithm or combination thereof.

The control circuit 112 controls the descrambler circuit 106 and the compression circuit 108. As described above, such control may be exercised for various reasons. First, the maximum compression bandwidth may be limited. Such limiting may be implemented by changing the compression algorithm, by reducing or increasing the redundancy removed from the data, or by simply not performing compression under certain circumstances. Second, the average compression bandwidth may be limited. Third, the control may be exercised for ATM flow control over the ADSL loop to assist ATM provisioning in the presence of bandwidth variation, which may be caused by compression (or other factors). Fourth, the control circuit 112 may direct the compression circuit 108 to selectively implement one of a number of available compression algorithms.

Figure 4:
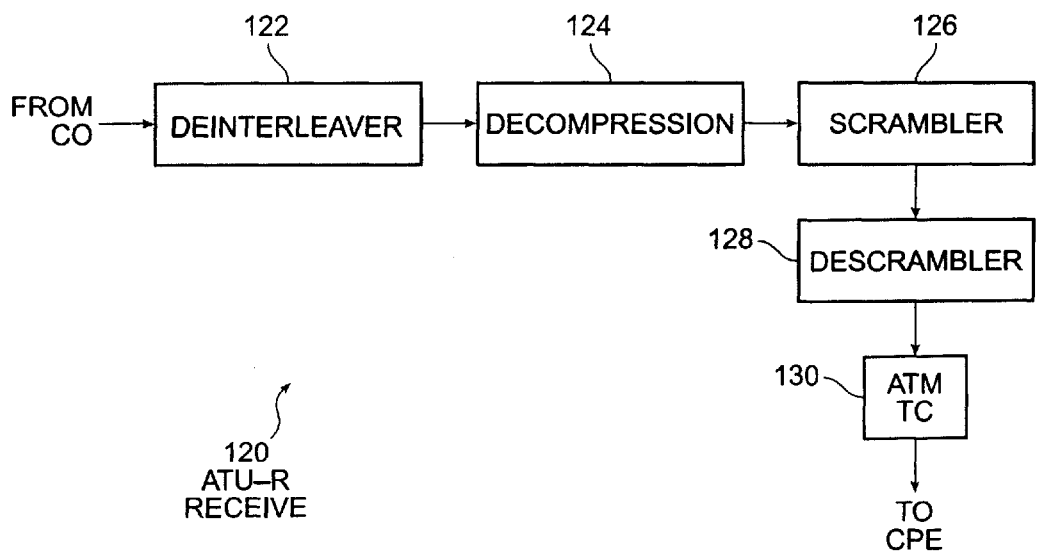
FIG. 4 is a block diagram of a portion of the reception side of a remote ATU.

FIG. 4 shows an ATU-R (reception portion) 120 according to an embodiment of the present invention. The ATU-R 120 basically performs the inverse of the functions performed by the ATU-C 100. The ATU-R 120 includes a deinterleaver circuit 122, a decompression circuit 124, a scrambler circuit 126, a descrambler circuit 128, and an ATM TC 130. The deinterleaver circuit 122 deinterleaves the data after reception from the central office. The descrambler circuit 128 performs descrambling prior to input to the ATM TC circuit 130. The ATM TC circuit 130 performs transmission convergence functions to the ATM data prior to its provisioning to the subscriber's various customer premises equipment (CPE) (e.g., telephone, computer, etc.). The ATM TC circuit 130, descrambler circuit 128 and deinterleaver circuit 122 may be standard components and are not further detailed, nor are the other standard components of ATU-R 120 that are not shown.

Between the deinterleaver circuit 122 and the descrambler circuit 128, decompression is performed. The decompression circuit 124 performs this function using an inverse of the compression algorithm used by the ATU-C 100. As discussed previously regarding FIG. 2, scrambling is needed so that the descrambler circuit 128 can operate as usual. The scrambler circuit 126 performs this function.

As can be seen, the ATU-C 100 and the ATU-R 120 acting together at the central office and the subscriber location, respectively, effectively increase the downstream data rate. In ADSL implementations, the downstream data rate is generally the one designers are concerned about. However, the principles of the invention may also be applied in the upstream direction, as shown in FIGS. 5–6.

Figure 5:
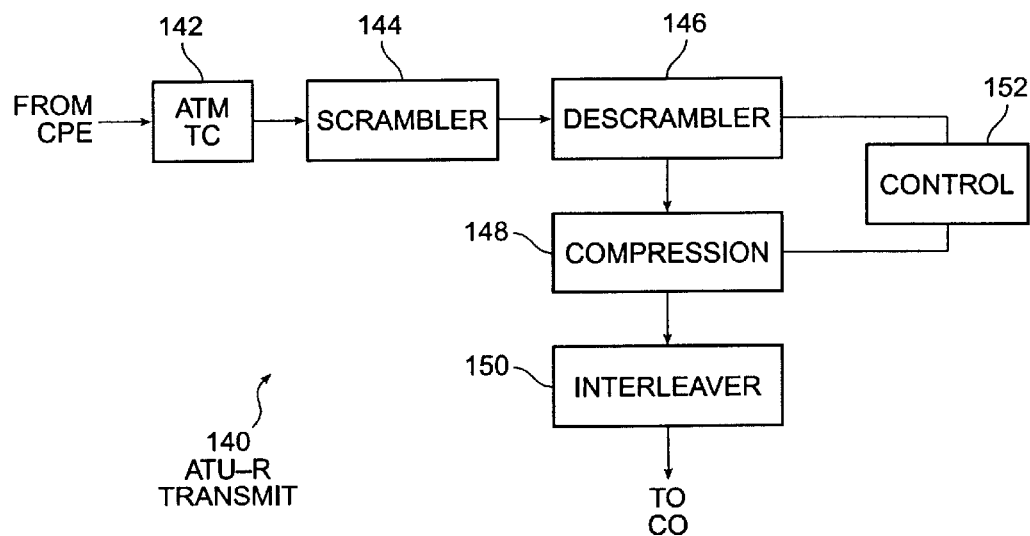
FIG. 5 is a block diagram of a portion of the transmission side of a remote ATU.

FIG. 5 shows an ATU-R (transmission portion) 140 according to an embodiment of the present invention. The ATU-R 140 includes an ATM TC circuit 142, a scrambler circuit 144, a descrambler circuit 146, a compression circuit 148, an interleaver circuit 150, and a control circuit 152. These components operate similarly to the components described above in the ATU-C 100 and are not further detailed.

Figure 6:
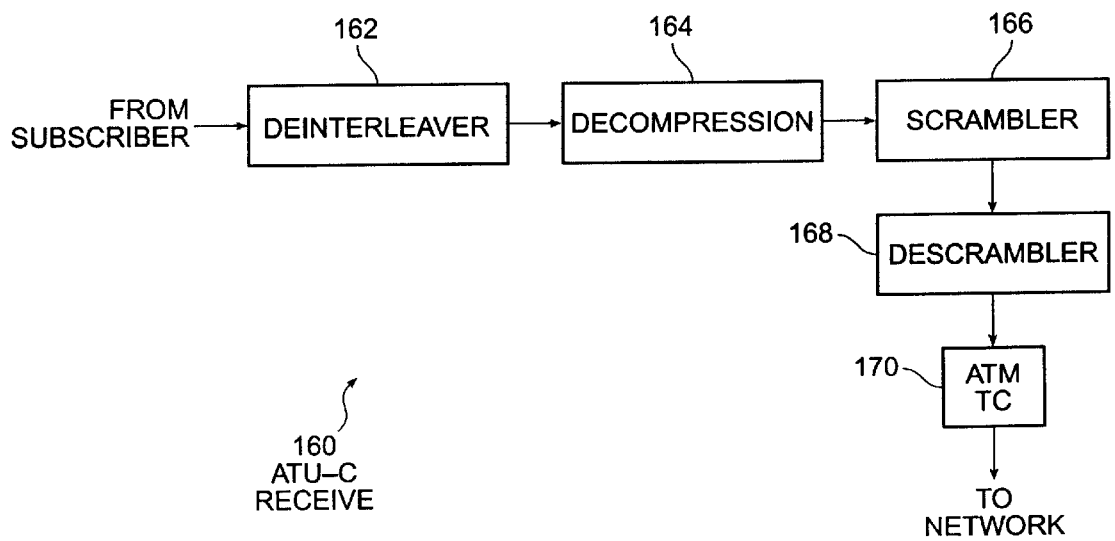
FIG. 6 is a block diagram of a portion of the reception side of a central office ATU.

FIG. 6 shows an ATU-C (reception portion) 160 according to an embodiment of the present invention. The ATU-C 160 basically performs the inverse of the functions performed by the ATU-R 140. The ATU-C 160 includes a deinterleaver circuit 162, a decompression circuit 164, a scrambler circuit 166, a descrambler circuit 168, and an ATM TC 170. These components operate similarly to the components described above in the ATU-R 120 and are not further detailed.

As can be appreciated, the ATU-C 100 and the ATU-C 160 may both be implemented as a single unit (e.g., in a line card), as may the ATU-R 120 and the ATU-R 140 (e.g., in a modem).

Although the preceding description has focused on specific embodiments, numerous variations, alternatives and their equivalents are considered to be within the scope of the present invention, which is defined by the following claims.

What is claimed is:

1. A digital subscriber line (DSL) termination unit comprising:
   - an asynchronous transfer mode (ATM) transmission convergence circuit operative to perform transmission convergence on first ATM data to generate second ATM data;
   - a scrambler circuit operative to create scrambled second ATM data from said second ATM data;
   - a descrambler circuit operative to create descrambled second ATM data from said scrambled second ATM data;
   - a compression circuit operative to create compressed second ATM data from said descrambled second ATM data;
   - an interleaver circuit operative to create interleaved second ATM data from said compressed second ATM data prior to transmission; and
   - a control circuit operative to control said descrambler circuit and said compression circuit, wherein said control circuit controls said descrambler circuit and said compression circuit to limit a maximum compression bandwidth.

2. The DSL termination unit of claim 1, wherein said DSL termination unit is a central office DSL termination unit, said first ATM data is received from a network, and said second ATM data is transmitted to a subscriber.

3. The DSL termination unit of claim 1, wherein said DSL termination unit is a remote DSL termination unit, said first ATM data is received from a customer premises equipment, and said second ATM data is transmitted to a central office.

4. The DSL termination unit of claim 1, wherein said DSL termination unit has a fast path and an interleaved path, and the descrambling and the compressing are performed on said interleaved path.

5. A digital subscriber line (DSL) termination unit comprising:
   - an asynchronous transfer mode (ATM) transmission convergence circuit operative to perform transmission convergence on first ATM data to generate second ATM data;
   - a scrambler circuit operative to create scrambled second ATM data from said second ATM data;
   - a descrambler circuit operative to create descrambled second ATM data from said scrambled second ATM data;
   - a compression circuit operative to create compressed second ATM data from said descrambled second ATM data;
   - an interleaver circuit operative to create interleaved second ATM data from said compressed second ATM data prior to transmission; and
   - a control circuit operative to control said descrambler circuit and said compression circuit, wherein said control circuit controls said descrambler circuit and said compression circuit to limit an average compression bandwidth.

6. The DSL termination unit of claim 5, wherein said DSL termination unit is a central office DSL termination unit, said first ATM data is received from a network, and said second ATM data is transmitted to a subscriber.

7. The DSL termination unit of claim 5, wherein said DSL termination unit is a remote DSL termination unit, said first ATM data is received from a customer premises equipment, and said second ATM data is transmitted to a central office.

8. The DSL termination unit of claim 5, wherein said DSL termination unit has a fast path and an interleaved path, and the descrambling and the compressing are performed on said interleaved path.

9. A digital subscriber line (DSL) termination unit comprising:
   - an asynchronous transfer mode (ATM) transmission convergence circuit operative to perform transmission convergence on first ATM data to generate second ATM data;
   - a scrambler circuit operative to create scrambled second ATM data from said second ATM data;
   - a descrambler circuit operative to create descrambled second ATM data from said scrambled second ATM data;
   - a compression circuit operative to create compressed second ATM data from said descrambled second ATM data;
   - an interleaver circuit operative to create interleaved second ATM data from said compressed second ATM data prior to transmission; and
   - a control circuit operative to control said descrambler circuit and said compression circuit, wherein said control circuit controls said descrambler circuit and said compression circuit to perform compression on selected links and to refrain from performing compression on other links.

10. The DSL termination unit of claim 9, wherein said DSL termination unit is a central office DSL termination unit, said first ATM data is received from a network, and said second ATM data is transmitted to a subscriber.

11. The DSL termination unit of claim 9, wherein said DSL termination unit is a remote DSL termination unit, said first ATM data is received from a customer premises equipment, and said second ATM data is transmitted to a central office.

12. The DSL termination unit of claim 9, wherein said DSL termination unit has a fast path and an interleaved path, and the descrambling and the compressing are performed on said interleaved path.

13. A digital subscriber line (DSL) termination unit comprising:
   - an asynchronous transfer mode (ATM) transmission convergence circuit operative to perform transmission convergence on first ATM data to generate second ATM data;
   - a scrambler circuit operative to create scrambled second ATM data from said second ATM data;
   - a descrambler circuit operative to create descrambled second ATM data from said scrambled second ATM data;
   - a compression circuit operative to create compressed second ATM data from said descrambled second ATM data;
   - an interleaver circuit operative to create interleaved second ATM data from said compressed second ATM data prior to transmission; and a control circuit operative to control said descrambler circuit and said compression circuit, wherein said control circuit controls said descrambler circuit and said compression circuit to limit a flow of ATM cells according to a fullness of a buffer space.

14. The DSL termination unit of claim 13, wherein said DSL termination unit is a central office DSL termination unit, said first ATM data is received from a network, and said second ATM data is transmitted to a subscriber.

15. The DSL termination unit of claim 13, wherein said DSL termination unit is a remote DSL termination unit, said first ATM data is received from a customer premises equipment, and said second ATM data is transmitted to a central office.

16. The DSL termination unit of claim 13, wherein said DSL termination unit has a fast path and an interleaved path, and the descrambling and the compressing are performed on said interleaved path.

17. A digital subscriber line (DSL) termination unit comprising:
    an asynchronous transfer mode (ATM) transmission convergence circuit operative to perform transmission convergence on first ATM data to generate second ATM data;
    a scrambler circuit operative to create scrambled second ATM data from said second ATM data;
    a descrambler circuit operative to create descrambled second ATM data from said scrambled second ATM data;
    a compression circuit operative to create compressed second ATM data from said descrambled second ATM data;
    an interleaver circuit operative to create interleaved second ATM data from said compressed second ATM data prior to transmission; and
    a control circuit operative to control said descrambler circuit and said compression circuit, wherein said control circuit controls said descrambler circuit and said compression circuit to apply a selected one or more of a plurality of compression algorithms according to a type of said first ATM data.

18. The DSL termination unit of claim 17, wherein said DSL termination unit is a central office DSL termination unit, said first ATM data is received from a network, and said second ATM data is transmitted to a subscriber.

19. The DSL termination unit of claim 17, wherein said DSL termination unit is a remote DSL termination unit, said first ATM data is received from a customer premises equipment, and said second ATM data is transmitted to a central office.

20. The DSL termination unit of claim 17, wherein said DSL termination unit has a fast path and an interleaved path, and the descrambling and the compressing are performed on said interleaved path.

21. A digital subscriber line (DSL) termination unit comprising:
    an asynchronous transfer mode (ATM) transmission convergence circuit operative to perform transmission convergence on first ATM data to generate second ATM data;
    a scrambler circuit operative to create scrambled second ATM data from said second ATM data;
    a descrambler circuit operative to create descrambled second ATM data from said scrambled second ATM data;
    a compression circuit operative to create compressed second ATM data from said descrambled second ATM data; and
    an interleaver circuit operative to create interleaved second ATM data from said compressed second ATM data prior to transmission, wherein said DSL termination unit has a fast path and an interleaved path, and the descrambling and the compressing are performed on said interleaved path.

22. A digital subscriber line (DSL) termination unit for processing first asynchronous transfer mode (ATM) data, comprising:
    a deinterleaver circuit operative to create deinterleaved first ATM data from said first ATM data;
    a decompression circuit operative to create decompressed first ATM data from said deinterleaved first ATM data;
    a scrambler circuit operative to create scrambled first ATM data from said decompressed first ATM data;
    a descrambler circuit operative to create descrambled first ATM data from said scrambled first ATM data; and
    an ATM transmission convergence circuit coupled to perform transmission convergence on said descrambled first ATM data to generate second ATM data prior to transmission, wherein said DSL termination unit has a fast path and an interleaved path, and the decompressing and the scrambling are performed on said interleaved path.

23. The DSL termination unit of claim 22, wherein said DSL termination unit is a central office DSL termination unit, said first ATM data is received from a subscriber, and said second ATM data is transmitted to a network.

24. The DSL termination unit of claim 22, wherein said DSL termination unit is a remote DSL termination unit, said first ATM data is received from a central office, and said second ATM data is transmitted to customer premises equipment.

25. A system for compressing asynchronous transfer mode (ATM) data on a digital subscriber line (DSL) link comprising:
    a central office DSL termination unit including:
        a first ATM transmission convergence circuit operative to perform transmission convergence on first ATM data to generate second ATM data,
        a first scrambler circuit operative to create scrambled second ATM data from said second ATM data,
        a first descrambler circuit operative to create descrambled second ATM data from said scrambled second ATM data,
        a compression circuit operative to create compressed second ATM data from said descrambled second ATM data, and
        an interleaver circuit operative to create interleaved second ATM data from the compressed second ATM data prior to transmission to a subscriber via said ADSL link, wherein said central office DSL termination unit has a fast path and an interleaved path, and the descrambling and the compressing are performed on said interleaved path; and
    a remote DSL termination unit including:
        a deinterleaver circuit operative to create deinterleaved second ATM data from said interleaved second ATM data received from a central office via said ADSL link,
        a decompression circuit operative to create decompressed second ATM data from said deinterleaved second ATM data,
        a second scrambler circuit operative to create scrambled second ATM data from said decompressed second ATM data, a second descrambler circuit operative to create descrambled second ATM data from said scrambled second ATM data, and a second ATM transmission convergence circuit coupled to perform transmission convergence on said descrambled second ATM data to generate third ATM data prior to transmission to customer premises equipment.

* * * * *